United States Patent Office 3,491,618
Patented Jan. 27, 1970

3,491,618
HYDROMECHANICAL COMPOUND TRANSMISSION WITH REVERSING GEAR MEANS
Heinz-Dieter Neuber, Krechting, Germany, assignor to A. Friedrich Flender & Co., Bocholt, Germany, a corporation of Germany
Filed Aug. 31, 1966, Ser. No. 576,357
Claims priority, application Germany, Sept. 1, 1965, E 30,023
Int. Cl. F16h 47/00
U.S. Cl. 74—718                                    9 Claims

ABSTRACT OF THE DISCLOSURE

Transmissions having a multiplicity of power transmission paths from the input shaft to the output shaft, which paths include a plurality of intermeshing gears, wherein at least two of said paths are adapted to rotate the output shaft in different directions, and further including a hydrodynamic torque converter associated with each path and associated with a means for introducing and removing hydraulic fluid from such converter wherein such converter is operative to transmit power when filled with hydraulic fluid and inoperative to transmit power when emptied of hydraulic fluid.

---

This invention relates in general to transmissions for delivering rotary power, and more particularly to a transmission which features a gear train arrangement providing a plurality of selectable alternate rotary power transmission paths from an input shaft to an output shaft.

Selection of a particular power transmission path corresponding to a given output shaft rotation direction, or to a given output shaft rotation direction and input-to-output speed ratio combination is accomplished in the invention by filling a hydrodynamic torque converter with hydraulic fluid so as to render it effective to transmit rotary power.

Accordingly, for each power transmission path there is provided a hydrodynamic torque converter which is series coupled with one of the gear carrying shafts defining such transmission path.

In the preferred embodiment of the invention, which features a single output shaft, only one gear train power transmission path at a time is utilized. However, in the case of other potential embodiments of the invention featuring multiple output shafts, one gear train power transmission path per output shaft can be utilized simultaneously. Consequently, in the preferred embodiment of the invention, only one torque converter at a time is operated on a steady state basis in a fluid filled condition, and all torque converters associated with non-selected power transmission paths are emptied.

The gear train utilized in the transmission of the instant invention has a plurality of intermeshing pairs of gears mounted on associated rotatable shafts and expediently arranged to define one set of power transmission paths assigned to forward direction output shaft rotation, and a second set of power transmission paths assigned to the opposite, or reversed direction of output shaft rotation. The number of power transmission paths in both forward and reversed direction sets thereof is preferably equal, so that a similar range of speed ratios is available for each direction of output shaft rotation.

The invention has particular applicability to rail vehicles, such as for example locomotives, especially those powered by internal combustion engines.

Gear drive type transmission with hydrodynamic torque converters of various types and designs are known for rail vehicles. For instance, arrangements are used whereby a reduction gear and a reversing gear which can be switched while standing still are located behind the hydrodynamic torque converter. If necessary, the effective range of such gear arrangements can be correspondingly increased by providing additional gear stages which can be switched into action from a neutral position. Gear drive transmissions have also become known of the type whereby a transition from one speed to another can also be made during the operation of the vehicle. In such transmission constructions, the subsequently added multi-step reduction gears are coupled via suitable control gears by means of force-locking mechanical couplings, such as clutches. This type of design encompasses arrangements which require a reduction of the driving motor output to idling speed during the shifting process, and also encompasses transmission arrangements which permit gear shifting at full engine output. On the other hand, the reversing gears of the aforementioned arrangements can ordinarily be shifted only while the vehicles stand still, since they are equipped with form-locking positive couplings or clutches. However, reversing gears have been suggested in the art whereby the shifting of gears takes place by means of hydraulically activated force-locking clutches. Due to the high torques which have to be transmitted, such clutches are necessarily large in size, a feature which in turn, leads to relatively high no-load losses and thus to a reduction of the overall transmission efficiency.

Furthermore, rotary power transmission arrangements are known of the type wherein the shifting of speed ratios in a multi-stage gear train is achieved by hydraulic clutches or torque converters. Some of these shifting clutches and converters are used to engage starting gears, and others to engage gears used for power transmission in the normal operating speed-torque range. Since hydraulic fluid acts as the power transmission medium in such clutches and converters, the gears which they shift can be engaged and disengaged by respectively filling and emptying corresponding clutches and converters. Very often, the range of this type of gear transmission is expanded by means of a subsequent multi-step reduction gear which can be shifted while the vehicle is standing still, and which provides a first speed ratio generally known as its switching speed, and a second speed ratio which is commonly known as its rolling speed. The reversing gear, which is behind the multi-step reduction gear is similarly restricted to engagement only while the vehicles stand still.

In the case of rail vehicles, and particularly in the case of locomotives which need be shifted interchangeably from pulling to pushing operation, for efficiency in locomotive switching it is necessary that the shifting from one direction of motion to the opposite direction takes place quickly and smoothly, to minimize delays in making and switching train configurations. In the case of locomotives having gear driven transmissions equipped with form-locking or other types of positive reversing drive switches, as found in the prior art, it is absolutely necessary that the locomotive be first brought to a complete stop before reversing is attempted. Consequently in order to assure this, the prior art has developed various safety devices for use in conjunction with such locomotive transmissions which operate to permit an activation of the reversing clutch only if and when the vehicle has come to a complete standstill.

The invention is directed at providing a transmission suitable for use with rail vehicles, which has a gear train that can be shifted into various speed ranges in either forward or reverse without the use of any positive action clutch devices, and featuring a minimum of two selectable speed ratios for each direction of movement.

The invention solves the problem inherent with prior art rail vehicle transmissions by providing a transmission with a gear train unit having two transmission stages, one for each output rotation direction. Each of these transmission stages includes two similar hydrodynamic torque converters, one torque converter for each distinct speed ratio in a given output rotation direction. The pump impellers of these torque converters are each attached to a shaft which passes through the entire gear train unit, and the turbine wheels of the torque converters are solidly connected with individually associated hollow shafts which protrude from the respective converter. The pump shafts are simultaneously driven by means of a parallel output gear coupling connected to receive rotary power at a relatively high speed from a prime mover, and within the transmission the power take off is through gear wheels affixed to the turbine shafts and which mesh with intermediate gears on a countershaft which is in turn geared to the output drive shaft. For reversing the direction of rotation, the turbine shaft gear wheels of a converted path act as intermediate gears causing reversal of direction. In the transmission of the invention, the individual pairs of gears within the gear train are arranged to mesh continuously, and no mechanical displacement of any gear is required to effect shifting of speed ratios and/or reversal of output rotation direction. Shifting from one speed ratio to another in a given output rotation direction, as well as reversal of output rotation direction is accomplished by the filling of an appropriate torque converter with hydraulic fluid and the emptying of hydraulic fluid from all other converters in the transmission.

In order to provide two distinct forward speed ratios and two correspondingly equal but distinct reverse speed ratios, the invention utilizes intermeshing pairs of gears selected in equal ratio to transmit rotary power from torque converters used for each output rotation direction to the countershaft, which is directly geared to the output shaft. Thus, the torque converter turbine shafts are geared in the same ratio for the first speed ratio in the forward output direction as in the reverse output direction, and are likewise geared in the same ratio for the second speed ratio in both forward and reverse. While these individual first and second speed gear ratios can be any value desired, as between the forward and reverse direction, they are correspondingly equal.

In the case of the gear driven transmission according to the invention, it is possible while driving in one direction, to fill the appropriate torque converter for the opposite direction, while the converter for the original direction of motion is being emptied. If this is done, the vehicle driven by the transmission can be decelerated quietly ond quickly via the converter which is undergoing filling, because the turbine wheel thereof will be rotated against its normal direction of rotation and will act as a brake. The vehicle will be thus able to move in the new direction without any auxiliary braking action and with a minimum of delay in switching from one direction of movement to another which has been unavoidable with prior art transmissions which require braking and gear changing when going from one direction to an opposite direction of motion.

It is therefore, an object of the invention to provide a transmission for handling rotary power.

Another object of the invention is to provide a rotary power transmission which can be selectively reversed in direction of its output rotation.

A further object of the invention is to provide a rotary power transmission which affords a smooth, self-braking reversing action without the need of auxiliary braking and clutching.

A further object of the invention is to provide a rotary power transmission as aforesaid which is suitable for use in conjunction with rail vehicles.

A further object of the invention is to provide a rotary power transmission as aforesaid wherein a multiplicity of individually selectable input shaft-to-output shaft rotary power transmission paths are provided to accommodate power transmission at various speed ratios for each direction of output shaft rotation.

Still another and further object of the invention is to provide a rotary power transmission as aforesaid which features a duplicate set of available speed ratios for both directions of output shaft rotation.

Other and further objects and advantages of the invention will become apparent from the following detailed description and accompanying drawings in which.

Figure 1:
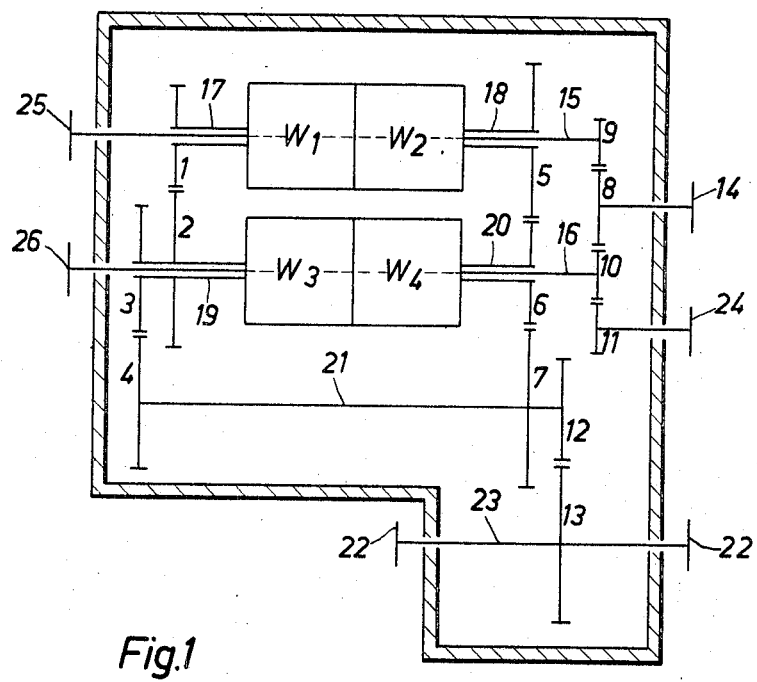
FIG. 1 is a schematic illustration of a rotary power transmission according to a preferred embodiment of the invention.

Referring now to FIG. 1, rotary power is supplied to the transmission T by means of a prime mover (not shown) coupled to its input shaft 14. Input shaft 14 beais a gear 8 which meshes with two other gears 9 and 10 respectively carried on shafts 15 and 16. Shaft 15 represents the tandem connected pump shafts of hydrodynamic torque converters W1 and W2, and shaft 16 similarly represents the tandem connected pump shafts of similar hydrodynamic torque converters W3 and W4.

The pump elements of torque converters W1, W2, W3 and W4 are driven at the same speed by reason of gears 9 and 10 being selected to provide equal ratios with gear 8. Any desired common speed ratio between pump shafts 15, 16 and input shaft 14 can be obtained by appropriate choice of gears 8, 9 and 10.

The turbine wheel elements of torque converters W1, W2, W3 and W4 are respectively connected to hollow shafts 17, 18, 19 and 20, which are expediently arranged for sleeve-wise extension over pump shafts 15 and 16.

Gear wheels 1 and 5 are mounted respectively to turbine shafts 17 and 18 associated with torque converters W1 and W2. The turbine shaft 19, associated with torque converters W3 bears two gear wheels 2 and 3. Turbine shaft 20, associated with torque converter 4, bears a gear wheel 6. As can be readily noted from FIG. 1, the individual pairs of gears 1 and 2, 3 and 4, 5 and 6, 6 and 7, are in meshing engagement as are the pair of gears 12 and 13, gear 12 being mounted on a countershaft 21, and gear 13 being mounted on the output drive shaft 23 of transmission T.

Output shaft 23 is provided with affixed gears or flanges 22 to accommodate coupling to the vehicle wheels (not shown) or other means to be driven by rotary power carried through transmission T, and in turn, the output shaft 23 is driven by the rotation of countershaft 21 as transmitted through gears 12 and 13.

Countershaft 21 itself is driven alternatively through the pair of gears 3 and 4, or through the pair of gears 6 and 7. Which particular pair of gears 3, 4 or 6, 7 actually transmits rotary power to countershaft 21 will depend upon which one of torque converters W1–W4 is filled with hydraulic fluid.

In the absence of filling any of the torque converters W1–W4 with hydraulic fluid, their associated pump elements and pump shafts 15 and 16 will rotate freely transmitting no power to any of the corresponding turbine shafts 17, 18, 19 and 20. Whenever a particular torque converter W1–W4 is filled with hydraulic fluid its turbine shaft will rotate in unison with its pump shaft, neglecting any effects of fluid coupling slippage between the pump and turbine elements of the converter.

In accordance with the preferred embodiment of the invention, the transmission T is so constructed and arranged as to provide two distinctive overall speed ratios for forward direction output shaft 23 rotation, and also two distinctive overall speed ratios for the reverse direction of output shaft 23 rotation. Preferably, the first speed ratios for both forward and reverse are made equal, as are the second speed ratios for forward and reverse.

Torque converters W1–W4 are preferably of similar construction so as to provide substantially equal fluid coupling characteristics. The torque converters W1 and W2 serve to accommodate the transmission of rotary power from shaft 15 to rotate output shaft 23 in a reverse direction, whereas torque converters W3 and W4 serve to accommodate the transmission of rotary power from shaft 16 to rotate output shaft 23 in a forward direction.

Of the four torque converters W1–W4 provided, only one at a time (under steady-state conditions), is filled with fluid, the other three being empty. The filled torque converter is the one that corresponds to a selected combination of speed ratio and output shaft 23 rotation direction, and only one torque converter is filled because the single output shaft 23 can have only one combination of rotation direction and speed ratio at a time.

In view of the fact that the torque converters W1 and W2 are similar in construction, at least as far as blading and direction of rotation are concerned, they effect reversal of output shaft 23 rotation because the gears 2 and 6 act as intermediate gears, or idlers, when the gears 1 or 5 respectively are driven by their associated torque converters W1 or W2.

The operation of the gear train in transmission T can be simply explained by assuming that torque converter W4 is filled and torque converters W1–W3 are empty. Under such conditions, the gear 6 will transmit rotary power to output shaft 23 via gears 7, 12 and 13. Shaft 23 can then be considered to rotate in a forward direction.

The same overall input shaft-to-output shaft speed ratio can be obtained in a reverse direction simply by filling torque converter W1 and emptying torque converters W2–W4. Under these conditions, rotary power is passed from gear 1 to output shaft 23 via gears 2, 3 and 4, and through gears 12 and 13.

Torque converters W2 and W3 serve to provide a selectable second speed ratio for the forward direction and reverse direction output rotations respectively. In order to obtain second speed ratio forward operation, torque converter W3 is filled and torque converters W1, W2 and W4 are emptied. This causes rotary power to flow through torque converter W3 to output shaft 23 via gears 2, 3, 4, 12 and 13.

Filling torque converter W2 and emptying torque converters W1, W3 and W4 provides second speed ratio reverse operation wherein rotary power flows through torque converter W2 to output shaft 23 via gears 5, 6, 7, 12 and 13.

The two speed ratios provided for forward and reverse operation can be made respectively equal by choosing gears 5 and 7 of the same size such that the net transmission ratio from gear 5 to 7 is 1:1, the size of the intermediate gear 6 being immaterial since when torque converter W4 is empty, gear 6 is an idler and has no effect on the gear 5 to gear 7 transmission ratio.

Gears 3 and 4 are also preferably chosen to have a 1:1 transmission ratio. The gearing ratio between the pairs of gears 1 and 2, and 6 and 7, may be chosen as desired, but must be a common ratio. Such a choice of gear ratios assures that the first and second speed ratios of transmisison T will be the same for both directions of output shaft 23 rotation.

The gearing ratio between gears 8, 9 and 10 is selected according to the input power consumption of the torque converters W1–W4 and the speed of the prime mover (not shown) which drives gear 8.

An auxiliary power take off shaft 24 can be expediently driven by gear 11 in mesh with gear 10, so as to provide mechanical power for driving a fill pump (not shown) used for selectively filling and emptying the individual torque converters W1–W4. Such fill pump can be flow-connected through appropriate hydraulic lines and selector valves (not shown) to the individual converters W1–W4 to enable hydraulic fluid to be shifted from one to the other in accordance with the particular rotary power transmission paths selected in transmission T.

Figure 2:
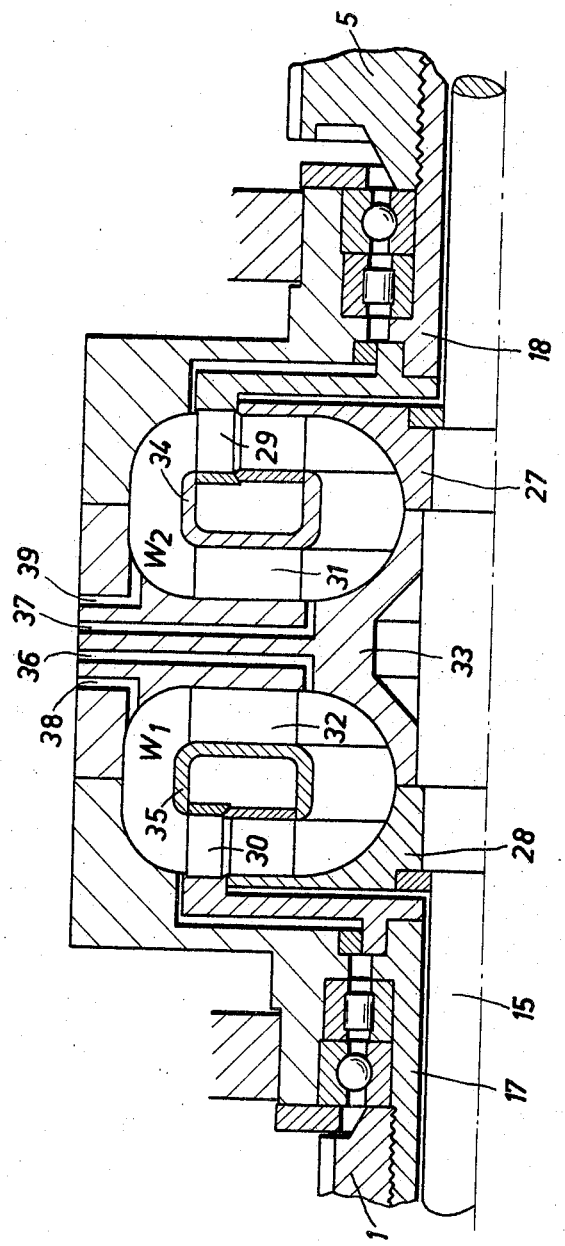
FIG. 2 is a longitudinal half-section view of a typical pair of torque converters used in the transmission shown in FIG. 1, showing details of the arrangement provided for coupling such torque converters to their associated gear shafts.

As is more clearly shown in FIG. 2, the pump shafts 15 and 16 can expediently extend through the entire gear train unit, and said pump shafts 15 and 16 can be equipped with flanges or gears 25 and 26 respectively to accommodate direct coupling to secondary or auxiliary equipment to be driven.

FIG. 2 is basically a longitudinal half section taken through converters W1 and W2, and as can be seen therein, the two pump wheels 27 and 28 are rigidly mounted on the pump shaft 15. The turbine wheels 29 and 30 are rigidly connected with the turbine shafts 18 or 17, respectively. The guide wheels 31 and 32 are solidly connected with the center of the housing 33 and they carry the respective inner rings 34 and 35. Hydraulic oil is fed by means of a control valve (not shown) and through a line 36 for the converter W1, and through a similar line 37 for converter W2. The drainage of the oil such as to an external heat exchanger or cooler (not shown) respectively takes place from converter W1 via a line 38 and from converter W2 via a line 39. The particular torque converter is always connected with the fill pump (not shown) which in turn is operated by means of an auxiliary drive taking power from gears 11 and/or 25. Selection of the particular converters to be filled and emptied can be expediently accomplished by means of control valves (not shown) located in lines 36 and 37 respectively for selection of torque converters W1 and W2. If one of such control valves is closed, the torque converter associated with it will no longer receive oil and will be emptied as a result of the effect of the turbine wheel 29 or 30 via lines 39 or 38 respectively.

Depending upon the needs of particular applications, the transmission T of the invention can be modified in various ways. For example, the gearing ratio between the gears 12 and 13 can be selected to provide a given rotational speed at the output shaft 23 for a given input shaft 14 speed.

The torque converters W3 and W4 with the turbine shafts 19 and 20 and their associated gears 2, 3, 6, and the pump shaft 16 are similar in design to the combination of torque converters W1 and W2 as shown in FIG. 2.

As can be appreciated by the artisan from the foregoing, the invention provides a transmission T which features a rotatable input shaft 14 disposed for coupling to a prime mover (not shown) to receive rotary power therefrom, a rotatable output shaft 23 for delivering rotary power, a gear train having a plurality of intermeshing pairs of gears carried on associated transmission shafts and which define a plurality of alternate rotary power transmission paths extending from the input shaft 14 to the output shaft 23. These rotary power transmission paths are individually selectable by filling with hydraulic fluid the torque converters W1–W4 corresponding to the desired transmission paths. Such selection by filling of torque converters W1–W4 is made possible by reason of the fact that the torque converter associated with each transmission path is actually interposed in series therewith so as to accommodate the transmission of rotary power through the path when the torque converter is filled with hydraulic fluid, and to interrupt the transmission of rotary power through the path when the converter is emptied. With a simple pump, control valve and hydraulic line means, which can be of conventional construction, hydraulic fluid can be selectively introduced and removed from the individual torque converters W1–W4 to fill one and empty the others in accordance with a selected direction of output shaft 23 rotation and a selected output speed ratio.

From the foregoing, it can be appreciated that the invention is susceptible of numerous modifications and variations all of which will become obvious. However, the invention is intended to be limited only by the following claims in which I have endeavored to claim all inherent novelty.

What is claimed is:
1. A transmission which comprises a rotatable input shaft disposed for coupling to a prime mover for rotation thereby and to receive rotary power therefrom; a rotatable output shaft; a gear train including a plurality of intermeshing pairs of gears carried on associated rotary power transmission shafts, which define two pairs of individually alternate rotary power transmission paths extending from the input shaft to the output shaft, one of said pairs of paths being for the transmission of rotary power from the input shaft to rotate the output shaft in a forward direction, and the other of said pairs of paths being for the transmission of rotary power from the input shaft to rotate the output shaft in the reversed direction, said intermeshing pairs of gears being in ratios to one another to define distinctive input shaft-to-output shaft speed ratios for each rotary transmission path in each pair thereof; four hydrodynamic torque converters, one converter each coupled to a gear train transmission shaft associated with a corresponding rotary power transmission path and interposed in series therewith to accommodate the transmission of rotary power through such path when said converter is filled with hydraulic fluid, and to interrupt the transmission of rotary power through such path when said converter is emptied of hydraulic fluid, and means for selectively introducing and removing hydraulic fluid from each of said converters to alternately fill the one corresponding to a rotary power transmission path of selected output shaft rotation direction and input shaft-to-output shaft speed ratio, and to empty the other converters corresponding to all other non-selected rotary power transmission paths.

2. The transmission according to claim 1 wherein said gear train includes intermeshing pairs of gears and associated shafts which define alternate rotary power transmission paths having input shaft-to-output shaft speed ratios which are correspondingly similar for the forward and reverse directions of output shaft rotation.

3. The transmission according to claim 1 wherein the pair of torque converters associated with each direction of output shaft rotation have pump elements which are coupled to a common shaft for rotation in unison therewith.

4. The transmission according to claim 3 including a gear mounted on said input shaft for rotation therewith, and a gear mounted on each of said torque converter pair pump shafts, said pump shaft gears being disposed in meshing engagement with said input shaft gear for rotation thereby together with their respective pump shafts.

5. The transmission according to claim 3 wherein the rotary power transmission paths corresponding to forward direction output shaft rotation are each defined by the combination of a pair of intermeshing gears coupling the common pump shaft of the forward direction torque converters to the input shaft for driving thereby, a pair of intermeshing gears coupling the turbine element of the respective forward torque converter to a rotatable countershaft to rotatably drive same when said torque converter is filled with hydraulic fluid, and a pair of intermeshing gears coupling said countershaft to said output shaft to rotatably drive same in the forward direction.

6. The transmission according to claim 5 wherein the rotary power transmission paths corresponding to reverse direction output shaft rotation are each defined by the combination of a pair of intermeshing gears coupling the common pump shaft of the reverse direction torque converters to the input shaft for driving thereby, a pair of intermeshing gears coupling the turbine element of the respective reverse torque converter to a rotatable idler shaft to rotatably drive same shaft when said torque converter is filled with hydraulic fluid, a pair of intermeshing gears coupling said idler shaft to said countershaft to rotatably drive same, and said pair of intermeshing gears coupling the countershaft to the output shaft, said idler shaft being operable to convert the rotation of the output shaft into a reverse direction rotation.

7. The transmission according to claim 6 wherein said idler shaft is constituted by a shaft connected to the turbine element of a forward direction torque converter for free rotation therewith when said forward torque converter is emptied of hydraulic fluid during operation of either reverse torque converter in a fluid filled condition.

8. The transmission according to claim 6 including an auxiliary power take-off gear disposed in meshing engagement with a torque converter pump shaft gear driven by said input shaft.

9. The transmission according to claim 6 wherein at least one of said torque converter common pump shafts is extended lengthwise and disposed for coupling to an external rotary power receiving means to deliver rotary power thereto from said pump shaft when same is rotated.

References Cited
UNITED STATES PATENTS

| 3,159,054 | 12/1964 | Gros | 74—732 |
| 3,176,544 | 4/1965 | Baumeister | 74—732 |
| 3,270,587 | 9/1966 | Geray | 74—732 |

ARTHUR T. McKEON, Primary Examiner

U.S. Cl. X.R.

74—732